United States Patent [19]

Stanislawczyk

[11] Patent Number: 5,143,971

[45] Date of Patent: Sep. 1, 1992

[54] RUBBERY CARBOXYLATED ACRYLATE POLYMER, LATEX, AND PREPARATION THEREOF

[75] Inventor: Vic Stanislawczyk, North Ridgeville, Ohio

[73] Assignee: The B.F. Goodrich Company, Akron, Ohio

[21] Appl. No.: 545,252

[22] Filed: Jun. 28, 1990

Related U.S. Application Data

[60] Division of Ser. No. 376,281, Jun. 6, 1989, Pat. No. 4,956,434, which is a continuation-in-part of Ser. No. 310,262, Feb. 13, 1989, Pat. No. 4,879,364, which is a continuation-in-part of Ser. No. 921,166, Oct. 20, 1966, abandoned.

[51] Int. Cl.$^5$ .................. C08L 31/00; C08F 22/02
[52] U.S. Cl. ................................. 524/833; 526/318.2
[58] Field of Search ..................... 526/318.2; 524/833

[56] References Cited

U.S. PATENT DOCUMENTS

| | | |
|---|---|---|
| 2,754,280 | 7/1956 | Brown et al. |
| 2,757,106 | 7/1958 | Brown et al. |
| 3,714,078 | 1/1973 | Gordon et al. |
| 3,875,099 | 4/1975 | Kurth et al. ............... 526/318.2 |
| 4,071,650 | 1/1978 | Gross |
| 4,137,389 | 1/1979 | Wingler et al. |
| 4,181,769 | 1/1980 | Plamondon et al. |
| 4,268,546 | 5/1981 | Schwartz et al. |
| 4,289,823 | 9/1981 | Arkens |
| 4,291,087 | 9/1981 | Warburton |
| 4,351,875 | 9/1982 | Arkens |

(List continued on next page.)

FOREIGN PATENT DOCUMENTS 61-23614 2/1986 Japan.

OTHER PUBLICATIONS

PCT International Search Report and references.
BFG Technical Report—Jul. 27, 1976.

(List continued on next page.)

Primary Examiner—Joseph L. Schofer
Assistant Examiner—N. Sarofim
Attorney, Agent, or Firm—George W. Moxon, II; Alfred D. Lobo

[57] ABSTRACT

A novel latex is derived from a crosslinked carboxylate latex containing from 1-20 phr of itaconic acid (IA) and at least 70 phr of one or more copolymerizable monomers one of which is an acrylate having the structure $$CH_2=C(R_1)-C(=O)-O-R_2 \quad (I)$$

wherein
$R_1$ is hydrogen or methyl;
$R_2$ represents $C_1$–$C_{20}$ alkyl, $C_2$–$C_7$ alkoxyalkyl, $C_2$–$C_7$ alkylthioalkyl, or $C_2$–$C_7$ cyanoalkyl; and
at least 40 phr of said acrylate in said film is present as an alkyl acrylate in which alkyl is $C_4$–$C_8$. The latex can only be formed in an aqueous medium by an emulsion polymerization process in which at least one-half of the IA is initially charged into a reactor, and the remaining ingredients of the receipe then added gradually. This unique order of addition produces a highly stable latex of polymer particles having a glass transition temperature ($T_g$) in the range from about $-20°$ C. to about $-60°$ C., and having on their surfaces, a concentration of carboxyl (COOH) groups which is at least twice that of COOH groups on particles of a latex formed by conventionally proportioning the monomer ingredients after initiation. The unique distribution of COOH groups permits the latex to be sprayed, for example on a non-woven fabric, without plugging the nozzle of a commercial spray gun, and imparts unexpectedly high blocking resistance to the non-woven. The unique characteristic concentration of carboxyl groups persists in an elastomeric film obtained by removing volatiles from the coalesced polymer particles. A self-supporting film is soft, but tough, with a raw tensile strength of at least 300 psi, at elongation of at least 350%, and exhibits less than 20% hysteresis loss.

6 Claims, 8 Drawing Sheets

U.S. PATENT DOCUMENTS 4,384,096  5/1983  Sonnabend.
4,395,515  7/1983  Dinklage et al..
4,406,660  9/1983  Beiner et al..
4,455,342  6/1984  Fink et al..
4,515,914  5/1984  Tsurumi et al..
4,959,665  11/1990  Kelley.

OTHER PUBLICATIONS

BFG Technical Report—Jul. 13, 1973.

"Preparation, Characterization and Alkali-Swelling Behavior of Carboxylated Latexes" by Shozo Nishida—doctoral thesis Lehigh University 1980—pp. 61 et seq.

"High Polymers—Vinyl and Diene Monomers", vol. XXIV, Part I, Chapter 4, p. 208, Wiley Interscience Publishers.

"Fundamentals of Binder Chemistry" by Wang, A. E., Watson, S. L. and Miller, W. P.—Union Carbide Corp., R & D Department, South Charleston Technical Center.

RUBBERY CARBOXYLATED ACRYLATE POLYMER, LATEX, AND PREPARATION THEREOF

This is a division of application Ser. No. 376,281, filed Jun. 6, 1989 now U.S. Pat. No. 4,956,434, which is a continuation-in-part of my copending patent application Ser. No. 07/310,262 filed Feb. 13, 1989, now U.S. Pat. No. 4,879,364, which is in turn a continuation-in-part of Ser. No. 921,166 filed Oct. 20, 1966, now abandoned.

BACKGROUND OF THE INVENTION

This invention relates to acrylate latexes prepared with a major amount of acrylate monomers, no more than about 20 phr (parts by weight based on 100 parts of monomers in the latex) of a monoolefinically unsaturated dicarboxylic acid (MUDA), and a small amount, from about 0.1 phr to about 20 phr of a crosslinking agent, the acrylate monomer being copolymerizable with the crosslinking agent and MUDA. To tailor the properties of the acrylate latex, it may also include at least one monoolefinically unsaturated monomer which is neither a MUDA nor an acrylate. Such a monoolefinically unsaturated monomer, neither a MUDA nor an acrylate, is referred to hereinafter as a non-acrylate monomer. The latex is made by an emulsion polymerization process in which the MUDA, and particularly itaconic acid (more correctly, methylenebutanedioic acid, or methylenesuccinic acid, and "IA" for brevity), is initially charged, hereafter "batched", in a conventional semibatch process (hence, "batched-IA" process).

In a semibatch process, commonly used in commercial manufacturing, monomers are proportioned to the reactor. Such proportioning permits control of the reaction, and the properties of the resulting latex. Such processes are versatile and permit production of a wide variety of latex products in a single reactor. Conventionally, the monomers are metered into a mixing tank, along with metered amounts of demineralized water (DW), soaps, deflocculants, etc. and thoroughly mixed to form a "premix". The premix is then flowed into a reactor, about the same size as the mixing tank, but equipped with a cooling jacket and various controls to make sure the reaction proceeds safely according to plan. While the premix is about to be metered into the reactor, and during the reaction, sufficient initiator and activator, along with additional DW, soap, deflocculants and/or buffers are added to the reactor at chosen intervals and predetermined rates found to produce a latex with desired properties.

Whether, a semibatch or batch addition process is used, a conventional process includes a pre-emulsification tank in which all monomers and chosen levels of other ingredients except a water solution of initiator or, in the case of redox initiation, of one initiator component, are emulsified before charging (see chapter on *Emulsion Polymerization*, Vol 6, pgs 10 et seq. in "Encyclopedia of Polymer Science and Engineering, Second Ed., Wiley-Interscience Publications, John Wiley & Sons 1986).

In a conventional process for making an acrylate latex, all the unsaturated carboxylic acid, whether mono- or di-, forms a part of the premix. In my process, at least an equal amount, preferably a major amount, and most preferably, all of the MUDA is placed in the reactor; all the other monomer ingredients being added semi-continuously throughout the reaction at chosen rates.

More specifically, this invention relates to an acrylate latex having particles constructed with polymer chains providing them with a unique architecture, by virtue of the method by which the latex is prepared; and, the method of doing so. The results of the unique architecture or morphology is evident in the properties of a self-supporting non-porous film (hereafter "film" for brevity) derived from a latex made with from about 1 phr to about 10 phr of a particular MUDA, namely IA, optionally in combination with another MUDA present in an amount in the same range, provided the IA is present in an amount greater than the another MUDA. The IA-containing latex has properties quite different from a latex produced with only the another MUDA, the other ingredients of the latex being the same, provided my novel and unconventional procedure for making the IA-containing latex is used. As will be demonstrated and described herebelow, use of IA produces the latex in which the polymer particles have a unique distribution of carboxylate groups, and a characteristic morphology.

Since a lower alkyl acrylate having up to 10 carbon atoms, for example n-butyl acrylate (nBA), and IA have widely differing polarities and water solubilities, the acrylate forms a separate 'oil' phase while the IA is present mostly in the aqueous phase. This physical reality, combined with the known retardation effect of IA in such polymerizations, produced undesirable properties in the polymers generally obtained, accounting in no small measure, for the use of a MUDA, in the prior art, in conjunction with a monocarboxylic acid, the latter being present in a greater concentration than the former. With particular respect to IA, it is known that the homopolymerization is difficult, requiring unusual reaction conditions.

My original goal was to produce a pressure sensitive adhesive. Latexes of acrylates having low glass transition temperature ($T_g$), such as of nBA, are known to produce commercial pressure sensitive adhesives. But numerous attempts in which I changed both the process and the reactant variables, resulted in failure to make an acceptable latex. The IA-containing latexes I made produced an excessive amount of coagulum, and when filtered, yielded a latex with poor stability evidenced by a short shelf life. Moreover, the levels of residual monomers, determined gravimetrically, were unacceptably high. In one of the last attempts, I placed all the IA in the reactor and separately dripped in, both a premix in which I had combined the acrylate monomer, the crosslinking agent, and soap in DW, and an initiator drip in which I combined the initiator, some more soap and a buffer such as ammonium carbonate.

Quite unexpectedly, I obtained a stable aqueous emulsion with much lower levels of residual monomers directly out of the reactor, though the latex contained no added stabilizers other than polymerization soap. Conducting some standard tests for pressure-sensitive-adhesives, we found the latex had poor pressure-sensitive-adhesive properties. However, I found that, even when the $T_g$ of my polymer was about $-60°$ C., upon neutralization with ammonia, I could spray it from a commercial spray gun, continuously for several hours without clogging the nozzle even when the solids content of the latex was in the range as high as from about 40% to 60%. This range is typically the 'reactor solids content' (that is, of the latex as it is removed from the reactor).

Unlike many carboxylate acrylate latexes of the prior art having the foregoing range of solids content, my latex is suprisingly less thick in the same range. I attribute this to the unique morphology of the polymer particles in my latex, as explained herebelow. Moreover, the stability of my latex, even with a 55% reactor solids content, is sufficient to allow the latex to be stored at ambient temperature up to about 59° C. (120° F.) for several months.

Further, a film derived by removing water from the latex I produced by placing at least half, preferably a major amount, and most preferably, all the IA in the reactor, was uniquely characterized by a remarkable combination of elasticity and tensile strength I refer to as "snap" because it is reminiscent of the type of "snap" associated with a common rubber band. To my knowledge, no film of any MUDA-containing acrylate latex in the prior art has "snap". I attribute this characteristic "snap", quantified herebelow, to the low reactivity of IA, and the unique morphological characteristics of the latex particles in which the carboxyl groups are distributed in a unique manner.

I attribute the surprising properties of the latex I produced, and the film derived from it, to the distribution and concentration of carboxyl (COOH) groups on particles of the latex which are formed by the "batched-IA" process, and to the disposition of the COOH groups in IA relative to the double bond, and the relatively difficulty accessible H atoms on the methylene group connected to the carboxyl group. The structure of IA is written as follows:

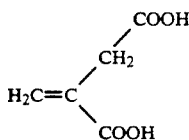

In addition to having the methylene group between a carboxyl group and the alpha carbon carrying the double bond, note that both carboxyl groups are on the same side of that double bond, one of the carboxyl groups being directly connected to the alpha carbon atom. No other MUDA, and specifically, neither maleic acid, fumaric acid, or citraconic acid has this unique feature.

Because the latex I produced was a carboxylated acrylate latex related to commercially available latexes, I made a comparison, and was surprised to find how favorably a film made from my latex compared to one made from a commercial latex. Among such latexes in particular, are Hycar$^R$2671 and Hycar$^R$26083 brands manufactured by The B. F. Goodrich Company, the assignee of this application, and one designated TR934, which has been made for many years by Rohm and Haas Company. The Hycar brand latexes contain no MUDA. Because it is not known whether TR934 contains any IA or any other MUDA, an effort was made to determine the presence of such MUDA by solid state NMR (nuclear magnetic resonance) spectroscopy and HPLC (high pressure liquid chromatography), inter alia, but no analytical procedure was capable of identifying what might be a low level, namely less than 10 phr of IA, in the latex.

Searching through patent references assigned to Rohm and Haas Company, and relating to IA-containing carboxylate latexes, I found the disclosure of such a polymer modified with a polyalkylene glycol in U.S. Pat. No. 4,059,665 to Kelley. A specific example of such a polyalkylene glycol-modified polymer was a copolymer of 48% by wt of butyl acrylate, 48% by wt of ethyl acrylate, about 0.5 to 2% of IA and about 2 to 3.5% by wt of N-methylolacrylamide (NMA) (see col 3, lines 20–25). In addition to admonishing that the copolymer in the aqueous dispersion must be obtained by emulsion copolymerization by a mixture of the designated copolymerizable molecules, he taught that omission of any one of the groups of copolymerizable molecules or substitution for any one of the groups will produce a copolymer which is not completely satisfactory . . . " (see col 3, lines 34–43).

Because of the different reactivities of a MUDA and a monoolefinically unsaturated monocarboxylic acid (MUMA), it is obvious that one would not expect to be able to substitute one for the other and produce a polymer having comparably close properties. Nor would one skilled in the latex art expect to be able, reasonably to predict, how changes in the method of making a latex, using either a MUDA or a MUMA, might affect the particle morphology and the properties of the film made from the latex. One does know that the performance properties of a latex largely depend upon the way it is made (see "Encyclopedia of Chemical Technology", Kirk & Othmer, 3rd ed., Vol 14, pg 92).

None of the foregoing expectations that the properties of a crosslinked carboxylate latex, made with a MUDA present in a greater amount than a MUMA, would have been difficult to predict, if the latex was made with a conventional polymerization process. Having made the latex by an unconventional emulsion polymerization process, I was still unprepared for the discovery that it was stable, and produced a self-supporting, continuous film, from about 1 mil to about 5 mm thick, which simulates natural rubber (NR), but with far better properties than NR.

Comparing a strip of NR having a thickness in the aforementioned range with a strip of my film, it is found that the NR is not stable at a temperature in the range from about 66°–160° C. (150°–300° F.). NR discolors rapidly and is degraded. Neither is NR stable in sunlight, or in air because of the ozone normally present. Even with conventional first quality stabilizers, NR film is not notably stable, typically disintegrating after 20 hr in a Weather-O-Meter. My film does not disintegrate after exposure under identical conditions in the same Weather-O-Meter. Moreover, NR is initially colored ranging from shades of brown to being milky at best, and NR film and articles made therefrom cannot be made water-white. My film is water-white as are shaped articles made from it. Further, my film can be laundered and dry-cleaned, as can be fabrics treated with my latex, while a film of NR cannot be drycleaned.

An even more remarkable characteristic of a film made from my latex is its surprisingly low $T_g$ for any crosslinked, predominantly acrylate film having comparable toughness and tensile strength. It is well known that, within any family of "soft" polymers, toughness is roughly correlatable with $T_g$, the higher the $T_g$, the greater the toughness and tensile strength. My film has a much higher tensile (and toughness) than would be expected for a film of its $T_g$.

SUMMARY OF THE INVENTION

It has been discovered that an emulsion polymerization process, in which an $\alpha,\beta$-monoolefinically unsaturated dicarboxylic acid (MUDA) is initially charged (hereafter "batched") into a reactor, and the remaining ingredients of the recipe then added gradually, produces a highly stable latex due to an unexpected distribution of carboxyl (COOH) groups in the latex particles. This distribution, when present in coalesced latex particles, results in an elastomeric self-supporting film of polymer which has "snap". "Snap" is a characteristic of a rubber which has a relatively low glass transition temperature ($T_g$) in the range from about $-20°$ C. to about $-60°$ C., a low percent hysteresis loss, typically less than 20%, and a relatively high raw tensile strength, typically at least 300 psi, along with an elongation of at least 350%. A film with "snap" is not obtained, using the same polymerization recipe, if the MUDA is conventionally proportioned with the other ingredients after initiation.

It is therefore a general object of this invention to provide an emulsion polymerization process in which the MUDA is "batched" into the reactor, and the remaining ingredients added thereafter, so as to produce latex particles on the surface of which there is a concentration (conc) of COOH groups (in carboxyl-rich polymer chains), which conc is at least twice as great as the conc of COOH groups in a latex produced with the identical recipe under identical process conditions, except that the MUDA is "premixed" with the other polymerization ingredients.

It has also been discovered that the effects of the unique composition and morphology of the aforementioned polymer are evidenced in a film derived from an itaconic acid ("IA")-containing, predominantly acrylate-containing, crosslinked latex, only if it is formed by the foregoing "batched-IA" process. The film has a characterstic "softness" defined by a $T_g$ in the range from about $-20°$ C. to about $-60°$ C., and a Shore A Durometer in the range from 30 to 60. Such a film has an unexpectedly higher toughness and tensile strength than one might expect of a film derived from a family of polymers produced from (i) only other MUDA-containing latexes produced by a process analogous to the "batched-IA" process, or, (ii) an IA-containing latex produced by the prior art "premixed-IA" process.

It is therefore a specific object of this invention to provide an IA-containing, predominantly acrylate-containing, crosslinked polymer in a latex in which said acrylate is represented by the structure

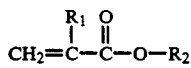

(I)

wherein
$R_1$ is hydrogen or methyl; and,
$R_2$ represents $C_1$-$C_{20}$ alkyl, preferably $C_4$-$C_{10}$ alkyl, $C_2$-$C_7$ alkoxyalkyl, $C_2$-$C_7$ alkylthioalkyl, or $C_2$-$C_7$ cyanoalkyl; and,
at least 40 phr (parts per hundred parts of monomers forming said polymer) of said acrylate in said latex is present as an alkyl acrylate in which alkyl is $C_4$-$C_8$ (hereafter "$C_4$-$C_8$ acrylate").

It has further been discovered that itaconic acid ("IA") has a unique influence on the architecture of polymer chains making up latex particles produced by the novel "batched-IA" process which produces carboxyl-rich chains near the surface of the latex particles. This unique influence of IA is attributable not only to the method of its addition in the novel process, but to the location of the COOH groups in IA relative to its double bond, which in combination imbues the latex with distinctive properties relative to a comparable prior art latex.

It is therefore a specific object of this invention to provide a novel IA-containing latex produced by a "batched-IA" process, comprising, confining at least one-half of the IA to be copolymerized, in a polymerization zone in which the temperature and pressure are maintained within specified limits, adding to said IA from about 0.1 to about 10 phr of a crosslinking monomer, and at least 70 phr of a copolymerizable monomer copolymerizable with said IA and crosslinking monomer, provided that the total amount of IA is less than 20 phr, and at least 40 phr of said copolymerizable monomer is a $C_4$-$C_8$ alkyl acrylate.

It is a further specific object of this invention to provide a process for preparing a mass of IA-containing polymer chains in which COOH-rich polymer chains are present as discrete agglomerates randomly distributed within the mass so as to provide a latex from which is derived a film having a $T_g$ in the range from $-20°$ C. to $-60°$ C. yet having a tensile strength of at least 300 psi at 350% elongation, with less than a 20% hysteresis loss.

It is another specific object of this invention to provide a mass of coalesced polymer particles, these particles having a central region consisting of polymer chains having relatively few COOH groups, and an outer region having a concentration of at least 5 COOH groups per nm$^2$ (square nanometer) of average particle surface, so that the film has more desirable properties than a similar glove made from natural rubber (NR).

BRIEF DESCRIPTION OF THE DRAWINGS

The foregoing and other objects and advantages of my invention will appear more fully from the following description, made in connection with the accompanying drawing, of preferred embodiments of the invention, wherein.

DETAILED DESCRIPTION OF PREFERRED EMBODIMENTS

Figure 1:
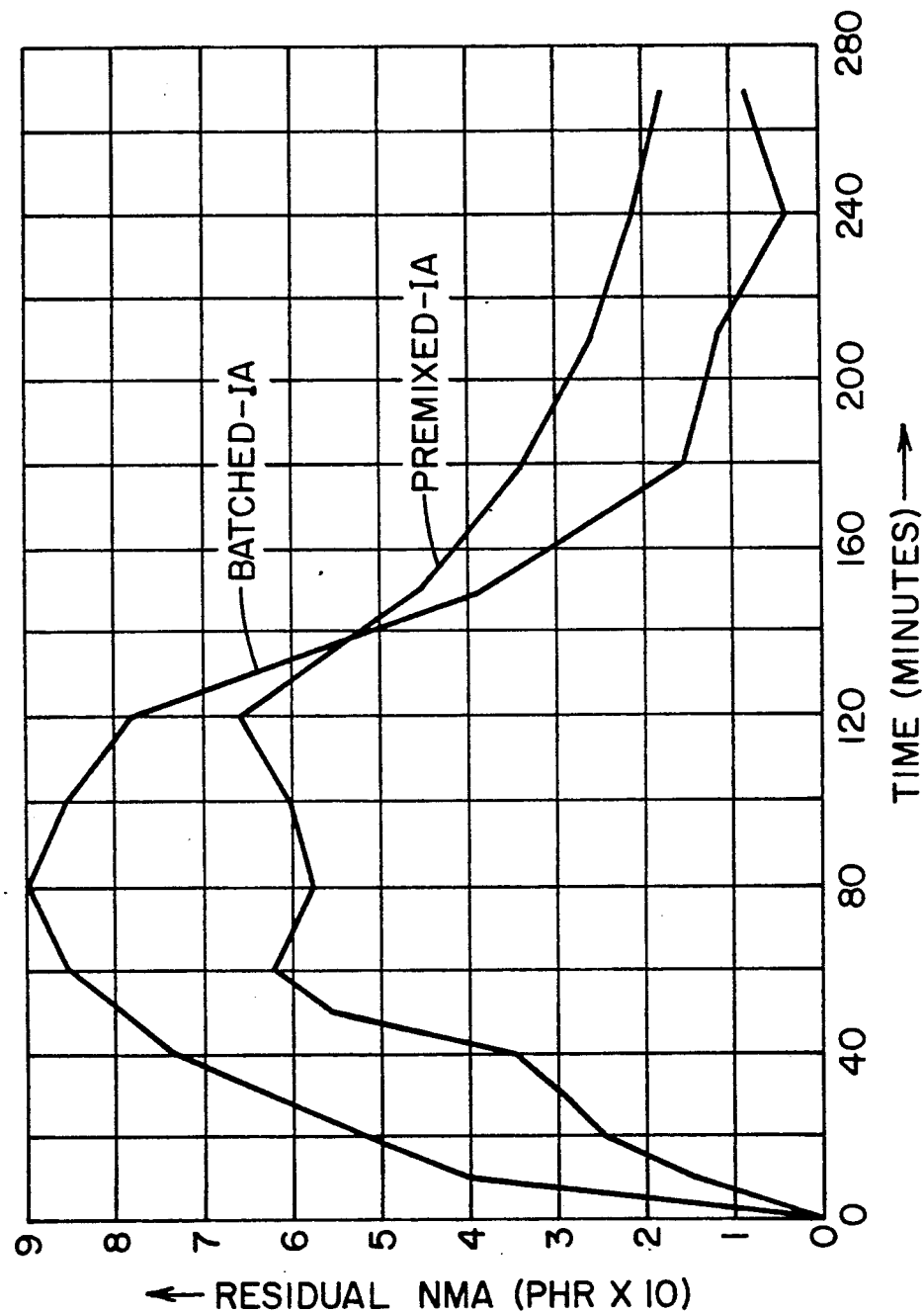
FIG. 1 is a plot of the residual amount of N-methylol acrylamide (NMA) left in each reactor as a function of time, the curve through the crosses being the amount of NMA left in the "batched-IA" reactor, and the other curve through the rectangles being the amount of NMA left in the "premixed-IA" reactor.

The unique morphology and properties of the novel latex are the result of the peculiar effect of the molecular structure of IA, and its batched addition in a reactor for the emulsion polymerization of IA with an acrylate monomer and a crosslinking monomer. For example, the cured latex has excellent adhesion for fibers of cellulosic, nylon, polyester, and other synthetic materials, yet has resistance to blocking even with a polymer having a $T_g$ of $-43°$ C. Direct evidence of such morphology is best observed in properties of a latex with $T_g$ $-43°$ C. polymer, and is provided by the following illustrative examples:

The $T_g$ $-43°$ C. latex is sprayed, essentially continuously, for several hours under pressure at ambient temperature, at concentrations as high as 60% using a Binks Model No. 777 spray nozzle, without plugging the nozzle. In a specific application, the latex (55% solids), is sprayed onto the upper surface of a moving batte of "Hy-Loft" (specify details of manufacturer and lot No.) polyester about 2.54 cm (1 inch) thick in an amount sufficient to penetrate a zone about 0.63 cm below the upper surface. The latex is found to be substantially uniformly distributed in the zone, and upon removing the water by drying in a curing oven, polymer which is essentially free of large agglomerates ("clumping") is adhered throughout the zone.

To study the characteristics of the emulsion polymerization reaction as it progresses in an aqueous medium in this "batched-IA" reaction, and also those of the prior art "premixed-IA" reaction, a side-by-side comparison of the reactions is made.

In large emulsion polymerization reactors, an upper limit for feed rate is defined by a process ability to remove heat at a sufficient rate to control the rise of temperature due to the highly exothermic reaction. Though operation of the reactor near this upper limit will minimize residence time in the reactor and maximize polymer production, safety constraints will impose a lower feed rate. The rate at which "premixed-IA" feed is introduced into the reactor is chosen such as to mimic that which would typically be used in a commercial reactor with a practical upper limit consistent with safety. This rate, so established for the "premixed-IA" reaction, is maintained in the "batched-IA" reaction. Slower rates may be used.

The general purpose for the comparative runs is to determine whether there are differences in their reaction kinetics, and if they exist, to determine whether they result in a distinguishable (a) polymer composition distribution as a function of time, measured at intervals after initiation of the reaction, and (b) cumulative composition distribution.

Each reaction is conducted under identical temperature and pressure conditions, with the identical amounts of monomers, initiator, soap and other incidental polymerization ingredients. The batched-IA reaction is conducted with all the IA in the reactor.

Progress of the reaction was monitored by withdrawing samples after the designated intervals of time, and storing each sample in a tightly capped vial which was immediately immersed in an ice-water bath to prevent further polymerization. Each sample was analyzed for residual n-butyl acrylate (nBA) by gas chromatography, and for N-methylol acrylamide (NMA) and IA by liquid chromatography. The results, namely the amounts of each monomer not incorporated ("residual" monomer) into polymer as a function of time, are plotted in FIGS. 1-3. The data points identified with crosses correspond to the batched-IA case; those identified with rectangles correspond to the premixed-IA case.

Ignoring the obvious experimental erro inherent in making the measurements, it is seen that in FIG. 1, the amount of residual NMA is greater for the batched-IA reaction than the residual amount of NMA in the premixed-IA reaction, during the first about 130 min of the polymerizations. Stated differently, the rate of consumption of NMA in the novel process is lower than that in the premixed-IA case.

Figure 2:
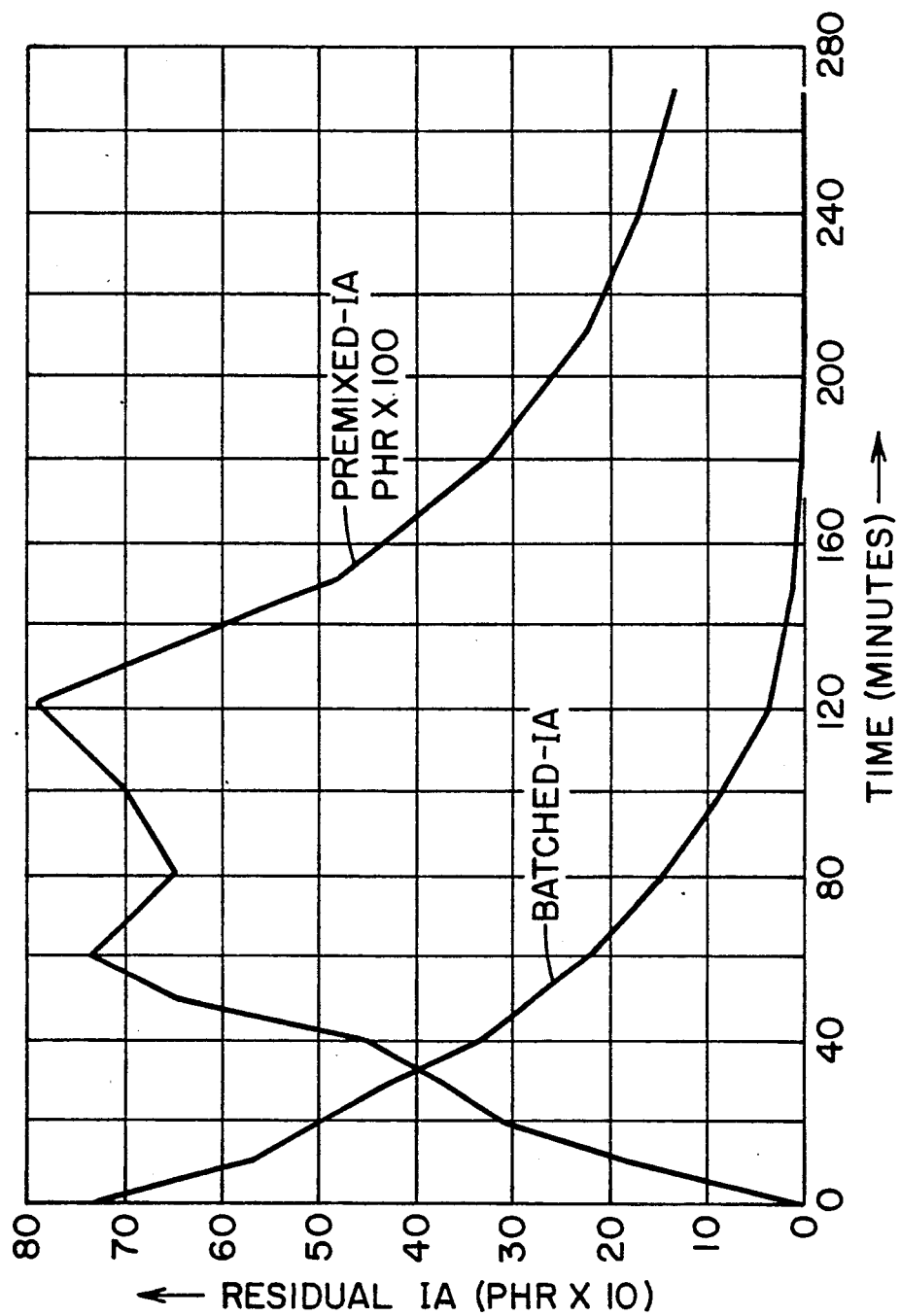
FIG. 2 is a plot of the residual amount of itaconic acid (IA) left in each reactor as a function of time, the smoothly falling curve being the amount of IA left in the "batched-IA" reactor, and the other curve being the amount of IA left in the "premixed-IA" reactor. The latter curve is drawn, enlarged ten-fold better to see the shape of the curve, so that the scale representing the actual residual values is one-tenth of the values shown in the graph.

Referring to FIG. 2, it is seen that, since the IA is all added initially, the residual IA is very high at the start. Since, in the premixed-IA reaction, there is no IA in reactor initially, the residual IA is initially zero. The rate at which IA is incorporated into the polymer in the batched-IA case is substantially constant, as indicated by the smoothly decreasing curve connecting the crosses. The rate of consumption of IA in the premixed-IA case first rises, peaks, then falls, as is seen in the curve connecting the rectangles. This latter curve has been plotted with actual residual values ($\times 10$) multiplied by ten, better to observe the rise and fall of the values.

Figure 3:
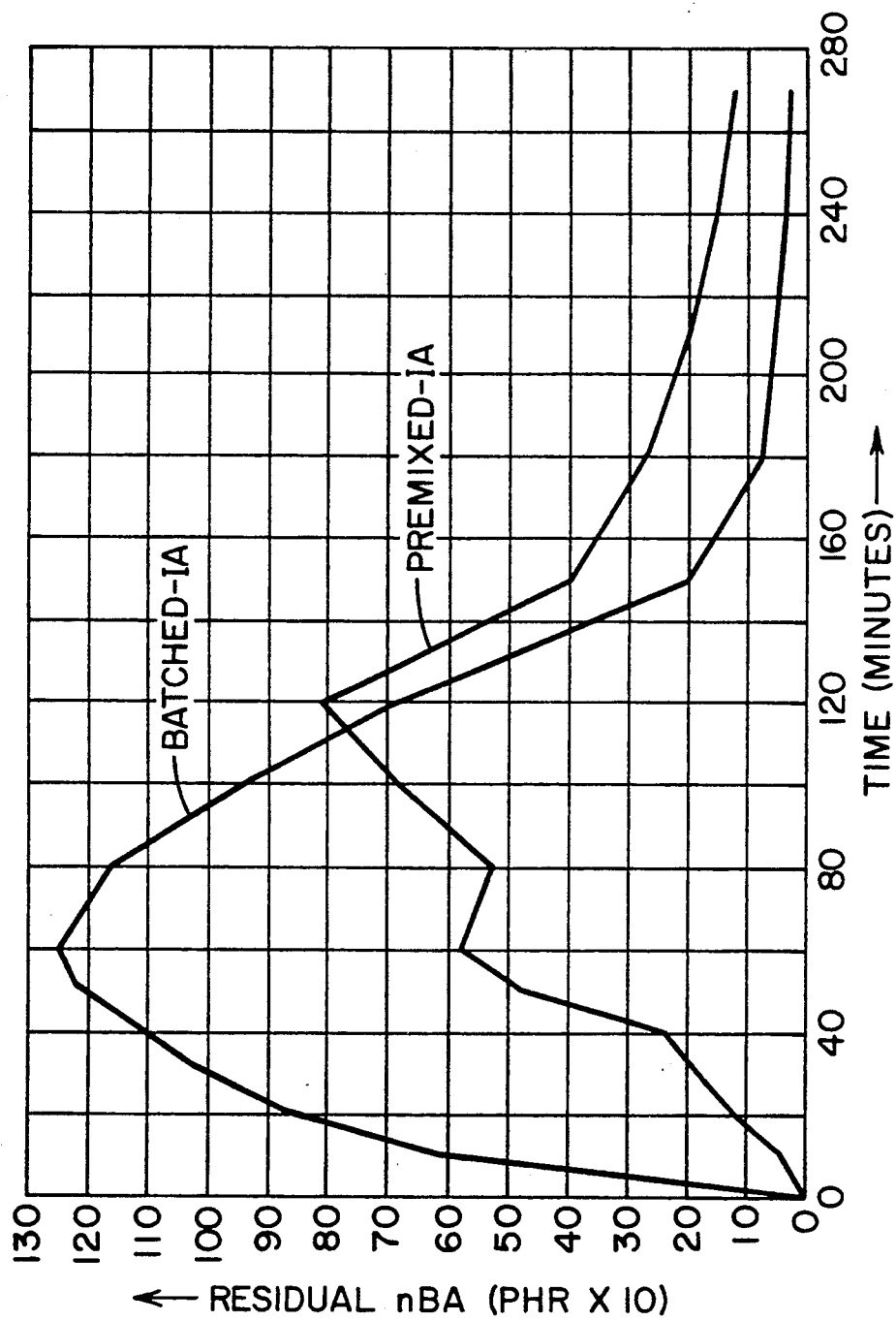
FIG. 3 is a plot of the residual amount of n-butyl acrylate (nBA) left in the reactors as a function of time, one being the amount of nBA left in the "batched-IA" case, and the other curve being the amount of nBA left in the "premixed-IA" case.

Referring to FIG. 3, it is seen that the amount of residual nBA is less for the premixed-IA reaction than the residual amount of nBA in the batched-IA reaction, during the first about 110 min of the polymerizations. Thereafter the residual amounts of nBA in each case is about the same. Stated differently, the rate of consumption of nBA in the premixed-IA case is higher than that in the batched-IA case during the first about 110 min, but the rates are then about equal.

A mass balance computation using the data points in the foregoing graphs, and knowing the rate of addition of each monomer, and also the rate of mass withdrawn with each sample, allows the generation of the data set forth in the following Tables 1 and 2 in which are tabulated data tracking the novel "batched-IA" and prior art "premixed-IA" reactions respectively.

TABLE 1

Novel "Batched-IA" Reaction

| Time of Reaction | Rate gm/min | Polymer Composition | | | Mass (gm) of Polym. formed/10 min. |
|---|---|---|---|---|---|
| | | nBA | NMA | ITA | |
| 0–10 | 8.3 | 93.9 | −2.4 | 8.6 | 83 |
| 10–20 | 11.3 | 98.9 | 0.6 | 0.4 | 113 |
| 20–30 | 12.4 | 97.1 | 0.4 | 2.5 | 124 |
| 30–40 | 13.2 | 93.2 | 0.0 | 6.9 | 132 |
| 40–50 | 12.3 | 94.8 | 0.5 | 4.7 | 123 |
| 50–60 | 14.0 | 94.2 | 0.3 | 5.5 | 140 |
| 60–80 | 15.8 | 95.4 | 0.6 | 4.0 | 154 |
| 80–100 | 18.5 | 95.1 | 1.2 | 3.6 | 185 |
| 100–120 | 19.3 | 95.5 | 1.2 | 3.3 | 193 |
| Feed discontinued | | | | | |
| 120–150 | 7.3 | 88.0 | 7.2 | 4.8 | 73 |
| 150–180 | 2.1 | 79.0 | 14.6 | 6.4 | 21 |
| 180–210 | 0.31 | 80.3 | 15.7 | 4.1 | 3 |
| 210–240 | 0.41 | 73.5 | 24.9 | 1.6 | 4 |
| 240–270 | 0.01 | — | — | — | 0.1 |

TABLE 2

Prior Art "Premixed-IA" Reaction

| Time of Reaction | Rate gm/min | Polymer Composition | | | Mass (gm) of Polym. formed/10 min. |
|---|---|---|---|---|---|
| | | nBA | NMA | ITA | |
| 0–10 | 16.6 | 96.2 | 1.0 | 2.9 | 166 |
| 10–20 | 15.7 | 96.1 | 1.0 | 2.9 | 157 |
| 20–30 | 15.9 | 95.4 | 1.4 | 3.3 | 159 |
| 30–40 | 15.7 | 95.9 | 1.1 | 3.0 | 157 |
| 40–50 | 10.7 | 100. | −1.7 | 1.6 | 107 |
| 50–60 | 13.2 | 96.8 | 0.6 | 2.7 | 132 |
| 60–80 | 16.9 | 94.5 | 1.6 | 3.9 | 169 |
| 80–100 | 13.2 | 95.2 | 1.3 | 3.5 | 132 |
| 100–120 | 12.0 | 97.3 | 0.3 | 2.4 | 120 |
| Feed discontinued | | | | | |
| 120–150 | 6.2 | 88.9 | 4.5 | 6.6 | 62 |
| 150–180 | 2.1 | 82.3 | 7.5 | 10.2 | 21 |
| 180–210 | 1.1 | 80.0 | 8.9 | 11.1 | 11 |
| 210–240 | 0.7 | 81.5 | 8.6 | 9.9 | 7 |
| 240–270 | 0.5 | 81.1 | 9.2 | 9.7 | 5 |

Ignoring the propagation of the experimental error propagated in the calculations from which the tabulated data are derived, it is seen in Table 2, that the instantaneous average composition of the polymer formed is essentially the same, that is, the amount of IA incorporated in the polymer during each interval, is essentially the same.

While the feed is being added, the rate of polymer formation is substantially constant. After addition is completed ("feed discontinued"), the rate of polymer formation drops progressively as the residual monomers are consumed. During this 'tail' period the amount of IA incorporated in the polymer increases. The reason for this is that during addition, there is always less IA consumed than added in the feed, with the result that there is a progressive accumulation of IA. When the feed is discontinued, there is an increase in the amount of IA incorporated in the polymer due not only to the increased concentration of IA but relative to the faster reacting monomers, namely nBA and NMA.

Now referring to the "batched-IA" reaction tracked in Table 1, it is evident that during the addition period, there is a higher level of IA incorporated into the polymer, due to its relative concentration, in combination with a lower level of NMA. When the feed addition is complete, there is no noticeable increase in the uptake of IA into the polymer. This is due to the lack of accumulation of IA. Furthermore, there is a significantly greater accumulation of NMA than in the prior art premixed-IA case. Referring to the rate of polymer formation, it is seen that there is a progressive increase until feed addition is stopped. Then there is a decrease, just as in the premixed-IA process.

Referring specifically to a comparison of the average compositions in the 'tail' period of each process, it is seen that there is a substantial difference at each interval. It is well known that small differences in average composition are generally representative of larger differences in the overall distribution of those compositions.

The foregoing description of details of the processes are corroborated in the FIGS. 1–3. Referring specifically to FIG. 2 it is seen that in the premixed-IA process there is a clear accumulation of IA with a maximum at about 120 min. The profile of this peaked curve is in sharp contrast to that of the other smooth curve connecting the crosses. This other curve in FIG. 2 represents the smooth consumption of IA during feed addition in the novel process. The novel process is thus essentially self-regulated because of the unique molecular structure of IA. This characteristic of self-regulating polymerization is the distinguishing characteristic of the novel process.

The differences in the rates of polymerization for each case, predicate different architectures for each case. The differences in rate of incorporation of each monomer as a function of time (of polymerization) is a further indication of a major difference in architecture. The differences in rates are attributable to the partitioning of each monomer between the serum and the latex particles formed, to the differences in reactivities of each monomer's double bond, and the resultant effects on the fate of the growing chains.

Because the latex particles formed are essentially insoluble in organic solvents, particularly if there are a significant number of crosslinks, we cannot measure the molecular weight of the polymer. But we know that the structural differences between IA, and, for example, citraconic acid (an isomer), are such that the rate at which chains form with IA as a reactive monomer, is relatively slow. The relatively slower rate with IA, inherent with its structure, results in a relatively shorter chain length.

Chains containing relatively few IA units and a large number of nBA units (that is, hydrophobic chains), are likely to find their way into the latex particle as it is forming, because it (the particle) is hydrophobic compared with the serum. Chains containing a relatively large number of IA units and fewer nBA units (that is, COOH-rich, less hydrophobic chains) are likely to go on the surface of the latex particle as it is forming, or be distributed randomly in the serum. When these COOH-rich chains are on the surface of a latex particle, its surface carries a high concentration of COOH groups. Characterization of carboxylated latexes is taught in Shozo Nishida's doctoral thesis "Preparation, Characterization and Alkali-Swelling Behavior of Carboxylated Latexes", (Lehigh University, 1980), the disclosure of which is incorporated by reference thereto as if fully set forth herein. Measurement of the concentration of COOH groups by a time-dependent conductometric titration, is taught at pg 61, et seq, supra.

When a crosslinking monomer (say NMA) is present, the affinity of the IA for the NMA produces concentrations of crosslinked sites which have a different interparticle anchoring effect, than if another dicarboxylic acid with differently positioned COOH groups, was used. The physical properties which result because of this unique interparticle anchoring effect, are evidenced in the T×E product, referred to hereinafter.

Characterization of the latex particles and a determination of the extent to which the architecture of the particles, the distribution of monomers in polymer chains, and the location of the COOH groups in the particles of latex, may be determined by transmission electron microscopy (TEM) with appropriate methods for obtaining photomicrographs.

Before the latex particles are examined and characterized by TEM, they must be cleaned. After polymerization the latex contains emulsifier, residual initiator and its decomposition products, other electrolyte (buffer, if used), water-soluble polymer, and unreacted water-soluble monomer, all of which must be removed from the aqueous phase; also to be removed are desorbable species from the surfaces of the latex particles.

Accordingly, a sample of the novel latex produced by the "batched-IA" process of this invention (hereafter this novel latex is referred to as #129), and a sample of a latex produced by the "premixed-IA" prior art method (hereafter this prior art latex is referred to as #130), were each cleaned by the serum replacement technique. This serum replacement technique was found to be particularly well-suited for cleaning carboxylated latexes by Shozo Nishida who then developed a conductometric titration method for the characterization of the cleaned latexes. The procedure comprises (i) following a change in conductance after injection of excess NaOH into a sample latex; (ii) after 24 hr, back-titrating, with HCl, the latex containing the excess NaOH; and (iii) assigning the amount of COOH groups neutralized during a predetermined period of neutralization, to a location within the particles; as described in Nishida, supra. A modified conductometric titration (see Nishida Chap III, and pgs 61 et seq, supra), which takes into account the time-dependence of the neutralization reaction, was used to determine the concentration of COOH groups on the surface of the cleaned latex particles.

To outline individual particles of latex in the field of view, a drop of diluted (20% by wt solids) cleaned latex #129 is added to several drops of 2% aqueous phosphotungstic acid (PTA). A drop of the PTA-containing solution was placed on a prepared TEM grid and then blotted to remove most of the drop. The grid was observed at various magnifications in a Phillips 400 TEM, using a cold stage procedure. A sample of the latex prepared by the prior art method was analogously negative-stained, so that each latex particle in the field of view is seen to be clearly outlined by the PTA.

Because ruthenium tetroxide (RuO$_4$) has been found to be a preferential stain for nBA, the samples were then stained by exposing each TEM grid to RuO$_4$ vapors for 20 min. The RuO$_4$ is vapor-deposited on the latex to contact not only the surface of each of the latex particles, but also to penetrate them. The results of the procedure are more clearly visible in the latex #129 particles, seen in FIG. 4A, than in those of latex #130.

Figure 4A:
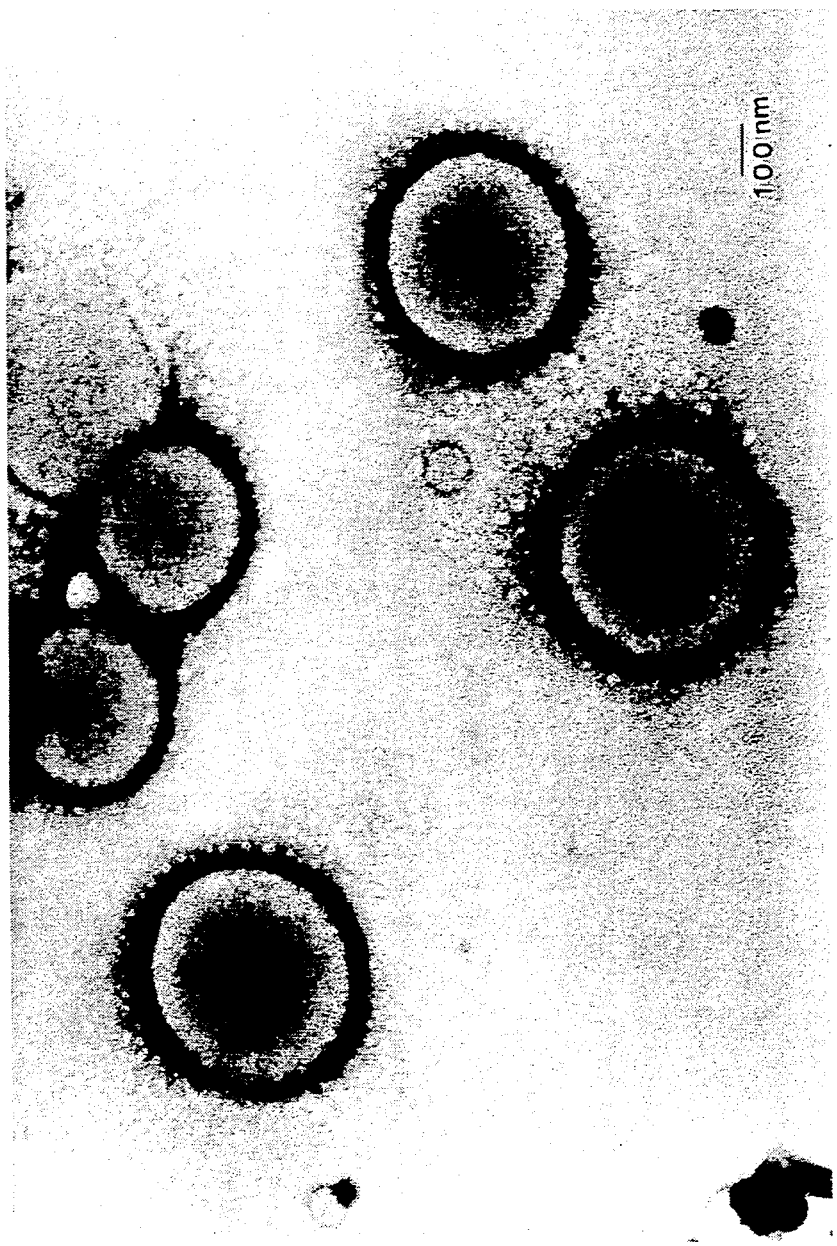
FIG. 4A is a photomicrograph made by transmission electron microscopy (TEM) of a representative sample of an IA-containing, NMA-crosslinked, nBA latex made by the "batched-IA" process of this invention, cleaned, treated with phosphotungstic acid (PTA), then exposed to ruthenium oxide (RuO$_4$) vapors.

Referring further to FIG. 4A, and in particular to the lower left hand corner thereof, there is seen an outline of a remaining PTA crystal with its hexagonal periphery. The spherical latex particles are seen to be clearly outlined by the PTA. Within the spheres is seen a relatively dark area bounded by a lighter annular area. This dark area is evidence of a concentration of acrylate groups stained by the RuO$_4$. The lighter annular area also represents stained acrylate groups but is lighter only because the electron beam travels through a lesser thickness of stained polymer in a spherical zone near the surface of the particle. The magnification of this photomicrograph is the same as that of FIG. 4B, and no significance is attached to the difference in size of the latex particles in 4A and in 4B, this being attributable to the characteristic formation of the latex under identical process conditions except for the manner in which the IA is introduced into the latex. The better-defined background and small, light-colored splotches are simply artifacts relating to the technical production of the photomicrograph.

Figure 4B:
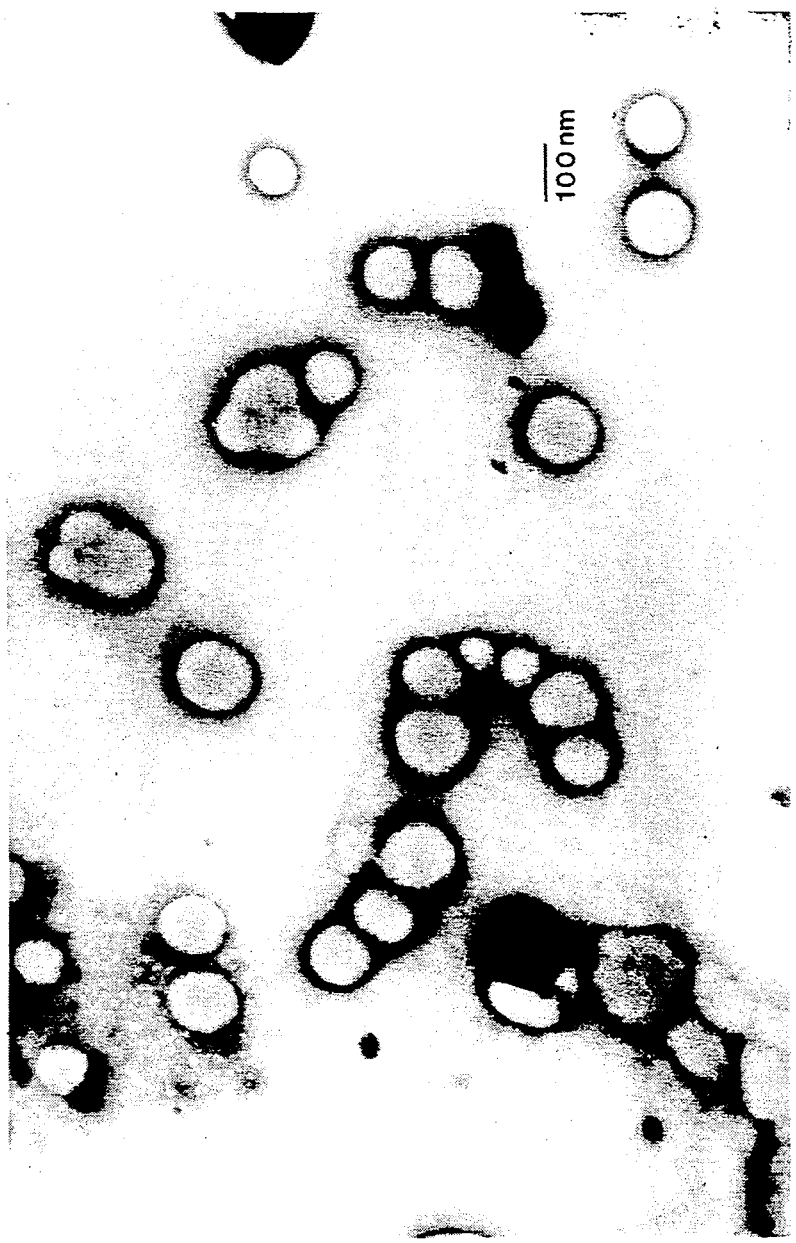
FIG. 4B is a TEM photomicrograph of a representative sample of an IA-containing, NMA-crosslinked, nBA latex having the same ingredients as in the latex shown in FIG. 4A, but made by the "premixed-IA" prior art process under the same process conditions used in the "batched-IA" process. The latex is cleaned, treated with PTA, then exposed to RuO$_4$ vapors, as before.

Referring further to FIG. 4B, and in particular to the area just below the center line in the lower left hand portion thereof, there is seen a very dark circle and a relatively lighter hexagonal area which represents a remaining PTA crystal. Remaining PTA crystals are less clearly outlined in the lower right hand portion. The latex particles are again seen as circles, but less clearly outlined by the PTA than in FIG. 4A. Within the circles in FIG. 4B is seen a central region only slightly darker than the background, and there is no clearly visible annular region which is lighter than the central region. The slightly darker area within the particles again indicates a concentration of acrylate groups, but it appears to be less decisivly stained by the RuO$_4$ than in FIG. 4A.

Thus, a comparison of FIGS. 4A and 4B shows what appears to be a lesser concentration of acrylate groups in the latex particles, but because of the difference in sizes of the particles in FIGS. 4A and 4B, the degree of gray shading may be more artifact than real, and not a clearly significant difference between the #129 and #130 latexes.

To determine if there is a significant difference in the manner in which COOH groups are distributed within each polymer, a comparison was made in accordance with the cesium hydroxide (CsOH) staining method taught in Nikida, pg 61 et seq., supra.

Figure 5A:
FIG. 5A is a TEM photomicrograph of a representative sample of an IA-containing, NMA-crosslinked, nBA latex made by the "batched-IA" process of this invention, then cleaned, and stained with cesium hydroxide (CsOH) and exposed, on a TEM grid, to RuO$_4$ vapors.

FIG. 5A (#129) is a photomicrograph of a viewed portion of a drop of diluted (20% by wt solids) latex #129, which drop was first neutralized by addition to 2 cc of 0.13M CsOH. Other samples, identically prepared, were examined with a cold stage procedure after various intervels of time ranging from immediately after the neutralization, up to 7 days later. Each sample was then stained with RuO$_4$.

In FIG. 5A is seen numerous latex particles which are visible as spheres having a central region shadowed with grey, and other areas including peripheral regions immediately surrounding the particles, also similarly shadowed against a white a background.

The unique feature of the photomicrograph is the profusion of mottled agglomerates dispersed among the latex particles. These represent agglomerates of COOH-rich chains of polymer which chains have dissociated from latex particles upon neutralization with CsOH. The mottled appearance indicates a non-uniformity of composition distribution of the stained chains in each of the agglomerates. The formation of such agglomerates is evidence of an architecture which allows mobility of the COOH-rich chains upon neutralization.

Figure 5B:
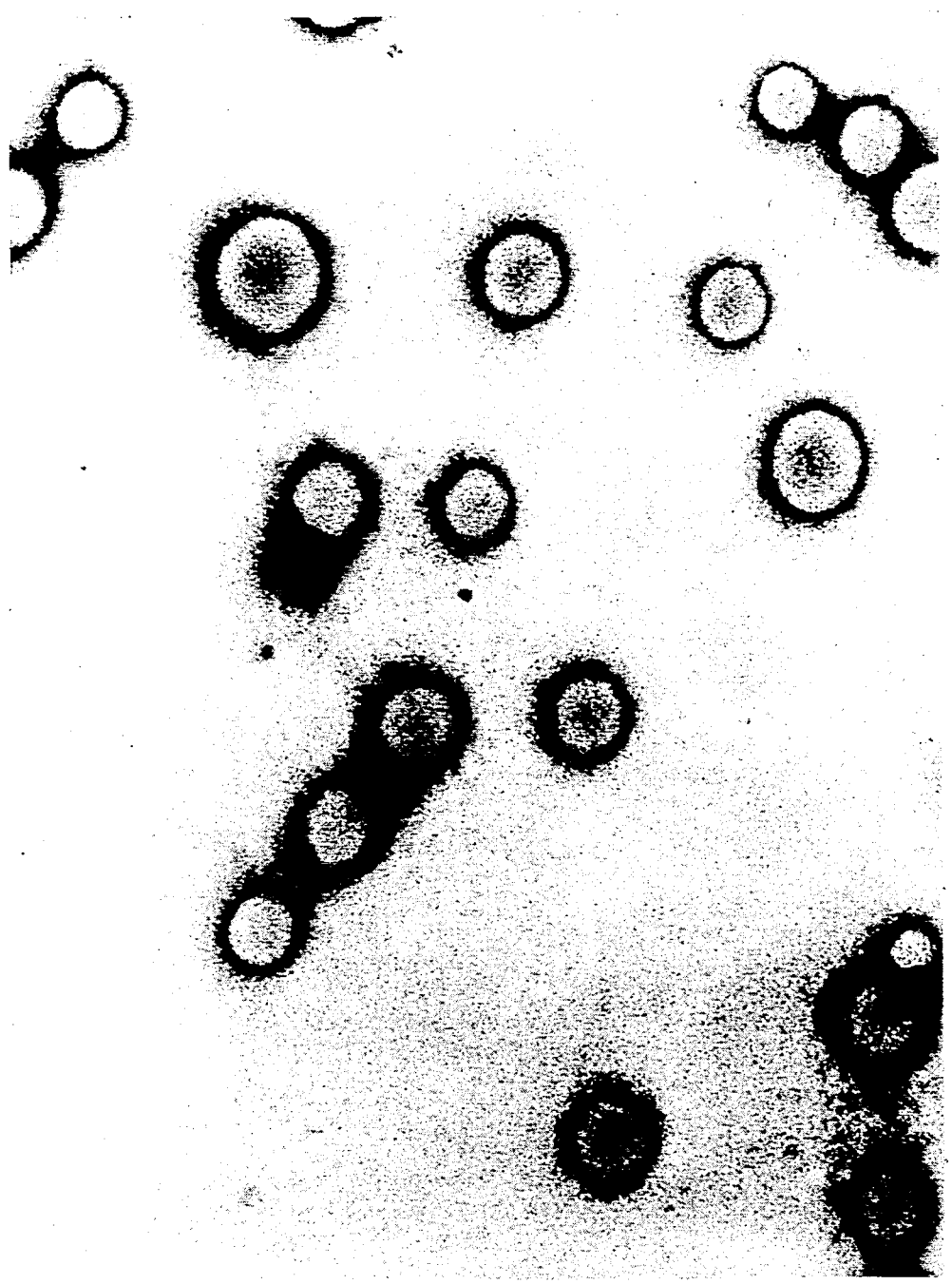
FIG. 5B is a TEM photomicrograph of a representative sample of an IA-containing, NMA-crosslinked, nBA latex having the same ingredients as in the latex shown in FIG. 5A, but made by the "premixed-IA" prior art process under the same process conditions used in the "batched-IA" process. The latex is then cleaned, and stained with CsOH and exposed, on a TEM grid, to RuO$_4$ vapors.

FIG. 5B shows no mottled agglomerates but a relatively larger grey area surrounding the latex particles. This grey area represents COOH-rich chains dissociated from the latex particles, but because these chains are relatively less mobile than the chains in FIG. 5A, they are held around the particles and cannot form the characteristic agglomerates formed in FIG. 5A.

Further comparing FIGS. 5A (#129) and 5B (#130), it is evident that there is very little evidence of staining of nBA within the particles of FIG. 5B which themselves appear to be "rough stained", that is not as sharply stained as the particles in FIG. 5A. This difference in staining appears to be real rather than an artifact, because it is evident in all samples of #129 and #130. Though there is nBA within all the latex particles, whether from #129 or #130, it is seen that the different gradation represents a difference in how the nBA is bound in the chains of the polymer in the latex particles.

The concentration of COOH groups near the surface of the particle are determined by the method described by Nishida, supra. The particle diameters are measured using a Zeiss Mop III particle size determination apparatus which measures the particle size in the field of view, using certain software to run a computer. At least 300 particles are measured and the surface area average diameters obtained. This diameter is used to compute the surface area in square nanometers ($nm^2$).

In the following Table 3, the latex identified as #129 refers to one made by the "batched-IA" method, and the one referred to as #130 is made by the "premixed-IA" method. The latex is made with n-butyl acrylate (nBA) and itaconic acid (IA) crosslinked with N-methylol acrylamide (NMA), at 75° C. and atmospheric pressure in each case, and the recipe for each is as follows:

nBA: 94 phr; NMA: 2 phr; IA: 4 phr
0.10 sodium lauryl sulfate
0.05 sodium persulfate

TABLE 3

| Latex | COOH groups per $nm^2$ surface | $m^2$ (surface) per gm polymer | Diam.* (cleaned) nm |
|---|---|---|---|
| #129 | 9.02 | 17.00 | 292 |
| #130 | 3.66 | 47.9 | 126 |

*surface area average

It is evident that the concentration of COOH groups near the surface of the latex for this particular monmer system, produced by the "batched-IA" process is more than double (twice) that of COOH groups near the surface of the latex produced by the "premixed-IA" process, which is visually confirmed in the photomicrographs. For this particular monomer system, the conc of COOH groups near the surface of the particles is generally at least 5 COOH groups/$nm^2$ of surface.

The foregoing distinguishing feature, namely the more than two-fold increase in COOH groups per unit area of latex particle surface, and the resultant peculiar relationship of $T_g$ and tensile strength which generates "snap", is attributable to the required presence of the IA and its unique structure, as well as to that of at least 40 phr of the $C_4$-$C_8$ alkyl acrylate of structure (I) in which $R_2$ is $C_4$-$C_8$.

Figure 6:
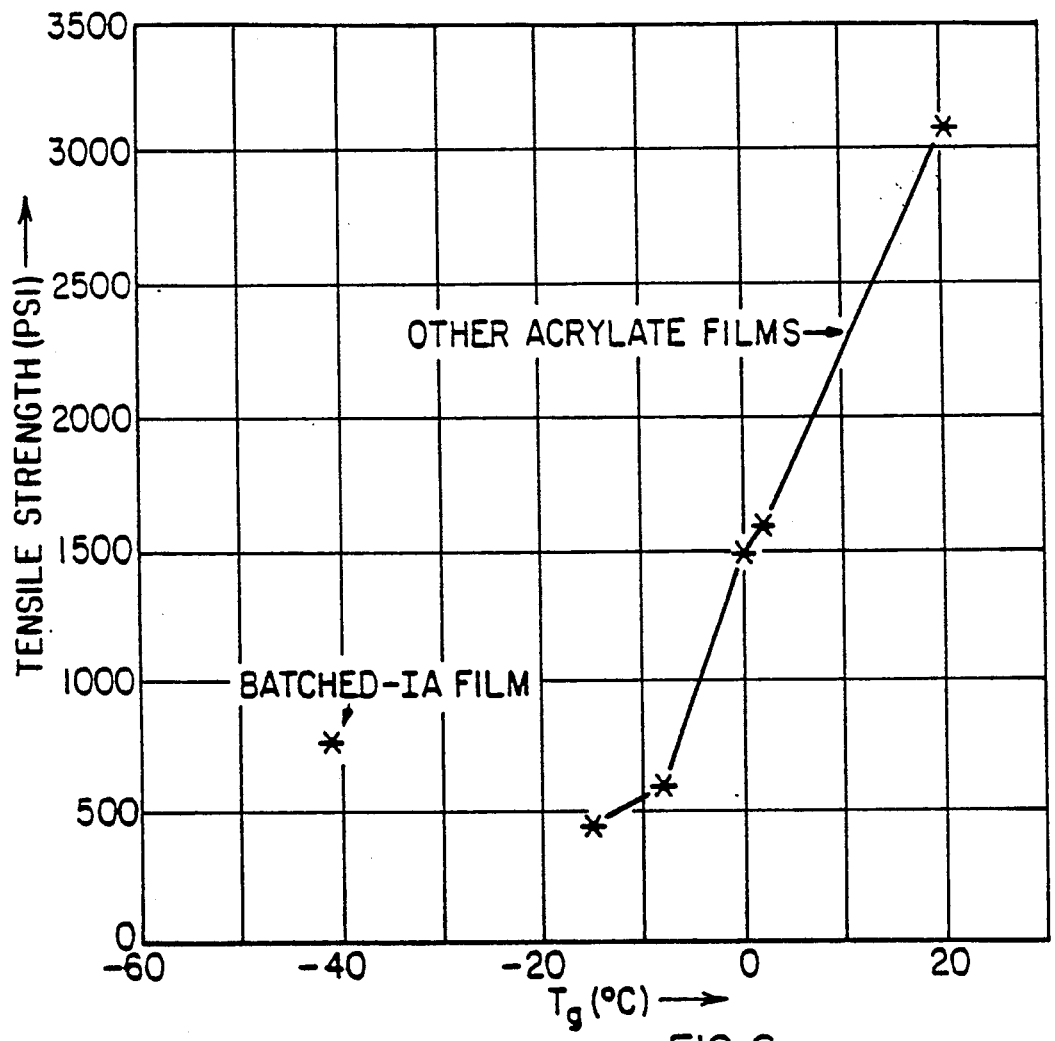
FIG. 6 is a graph of tensile strengths of films made from various acrylate latexes as a function of their $T_g$s, the latexes being from a family of "soft" acrylate polymers.

The relationship of $T_g$ (sometimes also referred to as "hardness $T_g$") and tensile strength in my film, relative to that of other acrylate polymers is evidenced by the "line" in FIG. 6 which is a plot of $T_g$ vs tensile strength (psi) for typical acrylic latexes, tabulated in the following Table 4, the data for which is taken from "Fundamentals of Binder Chemistry" by Wang, A. E., Watson, S. L., and Miller, W. P. (Union Carbide Corporation, Research and Development Department, South Charleston Technical Center).

TABLE 4

| Latex | $T_g$, °C. | Tensile, psi |
|---|---|---|
| Acrylic* | −44 | 773 |
| Acrylic | −15 | 450 |
| Acrylic | −8 | 600 |
| Acrylic | 0 | 1500 |
| Acrylic | 2 | 1600 |
| Acrylic-styrene | 20 | 3100 |

*film of Ex. 2 herebelow, in which all IA is charged initially to the reactor.

The latex of this invention is best prepared by polymerizing from about 2 phr to about 8 phr of IA with a much larger amount, preferably about 70 phr or more, of a $C_4$-$C_8$ alkyl acrylate monomer, and from about 1 phr to about 8 phr of a crosslinking monomer, with a free radical generating initiator sufficient for the purpose at hand, at a temperature in the range from about 30° C. to about 100° C., and a pressure ranging from ambient to about 5 atm. Higher levels of IA up to about 20 phr may be used, but the properties of the film derived from the latex formed, are not sufficiently better than those of film formed with less than 8 phr IA so as to make the much slower rate of polymerization, and the much larger amount of residual monomer, acceptable. In the event that a portion of the IA incorporated into the polymer is to be formed from citraconic acid, in situ, by the isomerization thereof to IA, at elevated temperature, as disclosed in *High Polymers—Vinyl and Diene Monomers* Vol XXIV, Part I, Chapter 4, pg 208, Wiley-Interscience Publishers, operation near the upper limit may be desirable. Similarly, higher pressures up to 50 atm may be used, and lower temperatures as low as about 0° C., but there is no economic justification for doing so.

In a typical latex formulation, the amount of IA is in the range from 2 to 8 phr; the crosslinking monomer is in the range from 1 to 6 phr; and the copolymerizable monomer(s) (so referred to solely as a nomenclatural crutch to distinguish it from the IA or other MUDA, and the croslinking monomer) is in the range from about 86 to 97 phr, by wt. It will be realized that the properties of the film derived from the latex may be tailored by choosing the amounts of each ingredient, as well as by choosing the particular crosslinking monomer and copolymerizable monomer(s). In many instances more than one crosslinking monomer, and more than one copolymerizable monomer may be copolymerized in my batched-IA process, but in all instances where from 0.1 phr to less than 20 phr, and preferably from 1 to 10 phr, of a copolymerizable monomer, not an alkyl acrylate is used, the remaining copolymerizable monomer is an alkyl acrylate having the structure (I), and at least 40 phr of a $C_4$-$C_8$ alkyl acrylate ($R_2$ is $C_4$-$C_8$ alkyl) is still essential.

Preferred copolymerizable acrylate monomers are $C_4$-$C_8$ alkyl acrylates and other monomers having structure (I) in which alkyl is $C_1$-$C_6$. Examples of other useful copolymerizable monomers are: diacrylate and dimethacrylate monomers such as ethylene glycol dimethacrylate, diethylene glycol diacrylate, and the like; $C_2$-$C_{10}$ monoolefins such as ethylene, propylene, isobutylene, 1-hexene, 1-octene, and the like; $C_2$-$C_{10}$ monoolefinically unsaturated carboxylates such as vinyl acetate, vinyl propionate, allyl acetate, and the like; $C_4$-$C_{20}$ vinyl ketones such as methyl vinyl ketone; $C_4$-$C_{20}$ allyl ethers such as vinyl methyl ether, vinyl ethyl ether, vinyl-n-butyl ether, allyl methyl ether, and the like; $C_8$–$C_{20}$ vinyl aromatics such as styrene, alpha-methyl styrene, p-n-butyl styrene, p-n-octyl styrene, vinyl toluene, and the like; $C_3$–$C_6$ vinyl nitriles such as acrylonitrile and methacrylonitrile; $C_4$–$C_{20}$ vinyl amides such as acrylamide, methacrylamide, N-methacrylamide, and the like; $C_4$–$C_{20}$ dienes and divinyls such as butadiene, isoprene, divinyl benzene, divinyl ether and the like; $C_2$–$C_{20}$ monomers containing a halogen, such as vinyl chloride, vinyl bromide, vinylidene chloride, vinylbenzyl chloride, vinylbenzylbromide, vinylchloroacetate, allylchloroacetate, 2-chloroethyl acrylate, chloroprene, and the like; unsaturated sulfonate monomers such as sodium styrene sulfonate, vinyl sulfonate, and the like; $C_4$–$C_{20}$ unsaturated carboxylic ester and unsaturated amide monomers such as dimethyl fumarate, dibutyl itaconate, the half-ethyl ester of IA, and the like; and, $C_3$–$C_5$ unsaturated monocarboxylic acids such as acrylic acid, methacrylic acid, and the like.

It is critical that, at least one-half of the IA (by wt) to be incorporated into the polymer, be placed in a single batch (hence "batched-IA" process) in the reaction vessel before the remaining monomer ingredients are added.

It is most preferred to add most, if not all the IA into the reactor before adding the remaining monomers in the recipe. The addition of the remaining monomers along with soap, initiator, stabilizers, antioxidants, buffers, etc. is controlled so as not to exceed the heat-removal capacity of the reactor. Controlled addition is also necessary to produce a stable latex with low levels of residual monomers. Upon completion of the polymerization reaction, product is withdrawn as a latex which may have as little as about 10%, and as much as about 68% by wt solids.

The copolymerizable monomer having structure (I) is more preferably one in which $R_1$ is hydrogen; and, $R_2$ is $C_4$–$C_8$ alkyl, or $C_2$–$C_8$ alkoxyalkyl, either of which may contain a primary, secondary or tertiary C atom. Examples of more preferred $C_4$–$C_8$ alkyl acrylates are n-butyl acrylate, isobutyl acrylate, n-pentyl acrylate, isoamyl acrylate, hexyl acrylate, 2-methylpentyl acrylate, n-octyl acrylate, and 2-ethylhexyl acrylate; of preferred $C_2$–$C_8$ alkoxyalkyl acrylates are methoxy acrylate, and ethoxyethyl acrylate; of a preferred $C_2$–$C_7$ alkylthioalkyl acrylate is methylthioethyl acrylate,; of preferred $C_2$–$C_7$ cyanoalkyl acrylates are cyanoethyl acrylate, and cyanopropyl acrylate; and mixtures of two or more of the foregoing may be used.

Upon removal of water, the novel latex coalesces to yield a polymer which preferably has a $T_g$ in the range from about $-25°$ C. to about $-50°$ C.; and is more suitable than NR for numerous applications. To begin with, a laminar strip of cured polymer has the characteristic "snap" of NR, less color which is objectionable, and much better heat, light and ozone stability. Unlike a NR latex, the batched-IA latex can be sprayed from a high-pressure spray nozzle, and the film resulting from drying the latex is essentially insoluble in common organic solvents.

The $T_g$ of the polymer is determined by conventional differential thermal analysis (DTA). A choice of suitable copolymerizable monomer is aided by reference to known formulae and data used as taught in references such as *Mechanical Properties of Polymers*, by L. E. Nielsen, Reinhold Publishing Corp (1967), Libr. of Cong. cat. card #62-18939; and in particular, to Chapter 2 thereof, which teaches transitions in polymers, and provides a list of $T_g$s of many polymers, including films of acrylate polymers, based on the monomers employed.

It will be evident from the foregoing criteria for choice of monomers for a $T_g$ in the specified range, some trial and error relating to tailoring the composition by the "batched-IA" process will generally be desirable before one can form a latex with specific fluid properties. For example, a small amount, in the range from 0.1 phr to less than 20 phr, of a "hard" copolymerizable monomer, may be used. A "hard" copolymer is one, the homopolymer of which has a $T_g$ of $80°$ C. or above. Examples of such "hard" monomers are $C_8$–$C_{12}$ vinyl aromatics including styrene, alpha-methyl styrene, and vinyl toluene; vinyl nitriles such as acrylonitrile and methacrylonitrile; vinyl chloride, and vinylbenzyl chloride, which if used at all, are preferably each used in an amount in the range from about 1 phr to 5 phr, depending upon the $T_g$ to be maintained.

The crosslinking monomer may be any monoolefinically unsaturated monomer capable of crosslinking chains of polymer containing IA and acrylate repeating units, and if present, repeating units of the non-acrylate copolymerizable monomer. The crosslinking monomer may be copolymerizaed with IA and the copolymerizable monomer into a main chain, thereafter providing a crosslinking site. Preferred are monoethylenically unsaturated crosslinking monomers containing a N-methylol group, such as N-methylol acrylamide, or a N-methylol derivative of allyl carbamate which may contain one or two N-methylol groups. The N-methylol groups may be etherified, as with $C_1$–$C_4$ alkanols. The alcohol is released on curing to regenerate the N-methylol group to complete the cure. Alcohol etherifying agents are methyl alcohol, ethyl alcohol, isopropyl alcohol, isobutyl alcohol, 2-ethoxyethanol, and 2-butoxy ethanol.

Preferred crosslinking monomers are selected from the group consisting of N-alkylol acrylamides having a $C_4$–$C_{18}$ alkyl group, and $C_7$–$C_{20}$ alkyl acrylamidoglycolate alkyl ethers. Specific examples of crosslinking monomers are N-methylol acrylamide, N-methylol methacrylamide, N-butoxymethyl acrylamide, iso-butoxymethyl acrylamide, and methyl acrylamidoglycolate methyl ether, preferably used in the range from about 0.5 to 3 phr. Most preferred is N-methylol acrylamide.

Conventional emulsifiers, both anionic and nonionic are used in an aqueous medium to produce the latex. Useful emulsifiers include alkali metal or ammonium salts of the sulfates of $C_8$–$C_{18}$ alcohols, such as sodium lauryl sulfate, ethanolamine lauryl sulfate, and, ethylamine lauryl sulfate; alkali metal and ammonium salts of sulfonated petroleum and paraffin oils; sodium salts of sulfonic acids such as dodecane-1-sulfonic acid and octadiene-1-sulfonic acid; aralkyl sulfonates such as sodium isopropyl benzene sulfonate, sodium dodecyl benzene sulfonate, and sodium isobutyl naphthalene sulfonate; alkali metal and ammonium salts of aromatic sulfonic acids, aralkyl sulfonates, long chain alkyl sulfonates, poly(oxyalkylene)sulfonates, and sulfonated dicarboxylic acid esters such as sodium dioctyl sulfosuccinate and disodium-N-octadecyl sulfosuccinate; alkali metal or ammonium salts of the free acid of complex organic mono- and diphosphate esters; and, copolymerizable surfactants such as vinyl sulfonate and the like. Useful nonionic emulsifiers include octyl- or nonylphenyl polyethoxyethanol.

Addition of the emulsifier, commonly referred to as 'soap', or 'surfactant', is conventional. It may be added to the reactor along with the IA and other MUDA, if the latter is used, or the soap may be premixed with the other ingredients added gradually to the reactor, or, distributed between the reactor and the premix, or otherwise added during the polymerization.

The amount of surfactant used is in the range from about 0.01 to about 10 phr, preferably from about 1 to 5 phr. An anionically stabilized latex will have a pH in the range from about 1 to about 6. The precise amount of surfactant used is not narrowly critical except if it used to control the particle size of the latex—generally, the more the surfactant placed in the reactor, the smaller the final particle diameter of the latex, and use of IA near the upper limit of the preferred range will normally require a correspondingly larger amount of surfactant to maintain a desirable particle diameter in the range from about 1000 to about 5000 Angstroms (Å).

The initiator, often in combination with an oxidation-reduction catalyst, is used in an amount which results in a suitable rate of polymerization chosen to provide a desirable temperature profile during the course of formation of the latex. Commonly used initiators include the free radical initiators such as the peroxygen compounds and persulfates, particularly benzoyl peroxide, t-butyl diperphthalate, pelargonyl peroxide and 1-hydroxycylcohexyl hydroperoxide; azo compounds such as azodiisobutyronitrile and dimethylazodiisobutyronitrile. Particularly useful initiators are the water-soluble peroxygen compounds such as hydrogen peroxide and sodium, potassisum and ammonium persulfates used by themselves, or in activated systems. Typical oxidation-reduction systems include alkali metal persulfates in combination with a reducing substance such as polyhydroxyphenols, oxidizable sulfur compounds such as sodium sulfite, sodium bisulfite, reducing sugars, dimethylamino propionitrile, diazomercapto compounds, and water-soluble ferricyanide compounds. Heavy metal ions may also be used to acitvate persulfate catalyzed polymerizations.

The initiator, most preferably an alkali metal or ammonium persulfate, may be conventionally charged either to the reactor, or mixed into the premix, or both, or incrementally added separately to control the rate of polymerization. The amount of initiator used is in the range from about 0.01 to about 10 phr, preferably from about 0.1 to 1.5 phr.

In the "batched-IA" process, at least one-half of from about 2 to 8 phr of IA, preferably a major amount by weight, and more preferably, all the IA to be used, is initially batched to a jacketed reactor. The IA is generally dispersed or dissolved in DW, optionally with some of the soap, buffering agent, and some of the initiator. From about 1 to 3 phr of crosslinking monomer (NMA, say) and from about 89 to 97 phr of a $C_4$-$C_8$ alkyl acrylate monomer are premixed with soap and some initiator, are thoroughly mixed, then gradually added to the contents of the reactor which may be heated to commence the polymerization. The premix is added to the reactor over a period of from about 0.5 to 10 or more hours, preferably from 1 to 4 hr. For better control and improved conversion, the initiator may be dripped in separately. When the polymerization commences, and the temperature of the reaction mass increases, a cold heat transfer fluid circulated in the jacket, is used to control the temperature, preferably in the range from about 40° C.-80° C.

The latex formed is typically treated or processed to reduce residual monomers and the pH is adjusted to a desired value, usually in the range from pH 6 to 8 to enhance stability of the latex. The latex is then filtered through cheese-cloth or a filter sock, and stored for further processing. The latex has a total solids content which may range from about 30% to about 60%, more typically from about 40% to 55% by wt.

The elastomeric self-supporting, continuous, non-porous film obtained by drying the latex exhibits hysteresis characteristics which when plotted as force vs elongation, produces a "tight" hysteresis curve indicative of excellent resilience. The area under the curve generated represents the amount of work energy needed to produce the elongation ($E_A$). The tighter the curve, the less heat generated by stretching or 'working' the film, that is, the lower the % hysteresis loss. However, resilience is not equivalent to "snap". "Snap" requires both high tensile strength and high elongation.

The hysteresis curves of each sample of film were obtained by the procedure described hereunder, and the percent (%) hysteresis loss computed from the data obtained.

The film samples were prepared by casting the latex on a backing sheet, and using a draw bar to produce raw film samples, 7 to 10 mils thick, upon air-drying the cast film and heating at 149° C. (300° F.) for 5 min. The film was cut into dumb-bell shapes. "Raw film" refers to film without compounding ingredients such as fillers, pigments, plasticizers and the like, and no curative ingredients are added. In those instances where the viscosity of the latex was too low to cast a film of the desired thickness, a thickener was added. The dry film is peeled from the backing sheet, dusted with talc if necessary (for easier handling) and heated for 5 min at 300° F.

The dumb-bell shaped test specimens are placed in the jaws (1 inch apart) of an Instron tensile testing machine and elongated to 200% elongation at a speed of 20 in/min. Elongation was measured using a 0.5 in benchmark. The jaws are then retracted at 20 in/min to their original position (thus completing one cycle); then, similarly elongated and retracted repetitively for five cycles. The hysteresis curve for each cycle to 200% elongation was obtained but data for the first cycle was not used. The % hysteresis loss was obtained using the data for the second cycle because the data obtained from the first cycle is erratic and non-reproducible effects due to initial stress and relaxation within the film.

In a hysteresis curve, the area under the curve upon contraction of the film to its original position, is a measure of the work energy expended ($E_B$) by the film. A perfectly resilient film exhibits no heat or other energy losses, therefore produces hysteresis curves in which $E_A = E_B$; that is, the curves overlap. The deviation from this ideal condition is the measure of the film's hysteresis loss. A gummy film has a very high % hysteresis loss.

The % hysteresis loss of the test samples was determined as follows:

$$\% \text{ hysteresis loss} = (E_A - E_B)/E_A \times 100$$

The unique characteristic of the film of this invention is that it has less than 20% hysteresis loss, and most preferably less than 15%.

The test results reported herebelow are the average of three separate measurements. They do not adequately reflect the soft, yet rubbery and tough nature of the film which has a raw film tensile strength of at least 300 psi and ultimate % elongation at least 350% as measured for cast film heated for 5 min at 300° F. A better appreciation of the nature of the film is provided by the T×E product which is a measure of the overall strength of the film. Another unique characteristic of the film is that its T×E product is at least 200,000, more preferably $300 \times 10^3$. "Snap" is inculcated in the film because of the combination of the low % hysteresis loss and the high T×E product.

Features of the "batched-IA" process, and the unique balance of properties of the film of this invention, will be more fully appreciated by reference to the following illustrative examples.

EXAMPLE 1

Comparison of Crosslinked Carboxylated Acrylate Films Prepared Using the Prior Art "Premixed-IA" Procedure Latexes were prepared by mixing all the monomers in a premix tank, as is conventionally done. In the following recipe the particular monoolefinically unsaturated carboxylic acid to be tested is the only ingredient which changes. The temperature of the polymerizing reaction mass was maintained at 75° C. during metering the premix, then increased to 80° C. during the 'tail' period. The premix was metered into the reactor over a 2 hr period. The recipe of the premix included n-butyl acrylate (nBA), N-methylol acrylamide (NMA), and the carboxylic acid being tested (if used), premixed in DW in a premix tank, along with some surfactant. The remaining surfactant was added to the DW initially charged to the reactor. All the initiator is added as a solution to the reactor before addition of the premix.

Placed in the reactor: 49 phr DW and 0.4 phr SLS.

The initiator solution: DW: 2 phr; sodium persulfate (SPS): 0.35 phr

The premix recipe: nBA: 94 phr; NMA: 2 phr; Carboxylic acid: 4 phr sodium lauryl sulfate (SLS): 0.6 phr; DW: 30 phr.

'Tail time': 2.5–3.0 hr at 80° C.

In the examples in the following Table 5, acrylic acid (AA), and methacrylic acid (MA), each a copolymerizable monocarboxylic acid, provide elongations comparable to that obtained with IA, but not the T×E product. In the example titled "None", no carboxylic acid was used, but 98 phr of nBA was added, the additional 4 phr taking the place of the missing carboxylic acid.

TABLE 5

|  | None | AA | MA | IA |
| --- | --- | --- | --- | --- |
| Tensile strength, psi | 207 | 305 | 330 | 693 |
| Elongation, % | 260 | 343 | 390 | 380 |
| T × E product ($\times 10^{-3}$) | 54 | 120 | 129 | 263 |
| % Hysteresis loss | 12.2 | 18.1 | 22.9 | 18.9 |

It is evident that neither AA nor MA has a tensile strength comparable to that of IA, therefore does not produce a T×E product of the same magnitude as that of IA. This combination of high tensile strength and elongation is a characteristic of the structure of IA in a conventional process though note that the % hysteresis loss is not much different. Though the film containing no acid produced the lowest % hysteresis loss, its tensile strength and elongation, and thus toughness, are all very poor.

EXAMPLE 2

Comparison of Film Properties Made with Different Proportions of IA in the Reactor and in the Premix Tank Four additional runs are made wherein the latex in each is made with the recipe used in Example 1 above, except that the distribution of IA, on a basis of 4, is varied in the reactor (R) and the premix tank (PT) as follows:

All IA in the reactor, designated in col 1# as 4R/OPT 3 IA in R, 1 in PT designated in col 2 as 3R/1PT 2 IA in PT, 2 in R, designated in col 3 as 2PT/2R 3 IA in PT, 1 in R, designated in col 4 as 3PT/1R All IA in the premix tank, designated in col 5 as 4PT/OR, is the run recorded in Example 1.

# of Table 6, refers to 1 of 5 columns of numbers. All runs are made using the same process conditions, except for the distribution of the IA, the process conditions being the same as in Example 1.

TABLE 6

|  | 4R/OPT | 3R/1PT | 2R/2PT | 1R/3PT | 0R/4PT |
| --- | --- | --- | --- | --- | --- |
| Tens. strength, psi | 755 | 843 | 890 | 645 | 693 |
| Elongation, % | 608 | 533 | 517 | 380 | 380 |
| T × E product ($\times 10^{-3}$) | 459 | 449 | 460 | 245 | 263 |
| % Hysteresis loss | 12.8 | 12.6 | 13.6 | 14.8 | 18.9 |
| $T_g$, °C. | −44 | | | | |

The $T_g$s of the other films were not measured.

Allowing for the experimental error inherent in the measurements, it is evident that, even when one-half the IA is in the reactor, the T×E product is about the same as when a major proportion, or all of the IA is in the reactor, but the % hysteresis loss is a little higher. This indicates that as long as at least one-half of the IA is in the reactor before addition of the remaining premixed monomers, one produces a latex in which the particles have a unique architecture which produces the properties measured above.

EXAMPLE 3

Comparison with Commercially Available Films

The significance of the T×E product and its important relationship to % hysteresis loss, is better appreciated by comparing the film of this invention with films, analogously made from commercially available latexes. In the following Table 7, "A" represents Hycar ®2671, "B" represents Hycar ®26083, each available from the BFGoodrich Company; and "C" represents Rhoplex ® TR934 available from Rohm & Haas Co. The IA film was made from a latex produced by the batched-IA process under conditions used in Exs 1 and 2 above, the latex recipe being:

94 phr nBA: 94 phr; NMA: 1.0 phr; and, IA: 4.0 phr.

TABLE 7

|  | IA | "A" | "B" | "C" |
| --- | --- | --- | --- | --- |
| Tensile strength, psi | 755 | 665 | 407 | 617 |
| Elongation, % | 608 | 610 | 1483 | 433 |
| T × E product ($\times 10^{-3}$) | 459 | 406 | 636 | 267 |
| % Hysteresis loss | 12.8 | 22.0 | 36.4 | 17.5 |
| $T_g$, °C. | −44 | −11 | −15 | −28 |

Though the tensile strength and elongation of Hycar ®2671 are comparable, both the % hysteresis loss and $T_g$ are much higher. Though the elongation of Hycar®26083 is much higher than that of the IA film, both the % hysteresis loss and $T_g$ are much higher. Though the % hysteresis loss and $T_g$ for the TR934 film are comparable, its $T \times E$ product is much lower.

EXAMPLE 4

Comparison with Other MUDA and MUMA for the Preparation of NMA-Crosslinked Polymer in a Batched-IA Process Under the Process Conditions of Example 1

Attempts to produce a latex in which only the IA in the batched-IA process was substituted with a monoolefinically unsaturated monocarboxylic acid (MUMA), whether acrylic acid (AA), or methacrylic acid (MA), resulted in forming a gel, despite the addition of copious quantities of DW to the reactor.

Each film tested in Table 8 hereunder was cast from a latex produced by the batched-IA process, and dried. The MUDAs, namely IA, fumaric acid (FA), maleic acid (MALA), and, citraconic acid (CA), were used in the same amount in the recipe:

nBA: 94.0 phr; NMA: 2.0 phr; and, MUDA 4.0 phr.

the remaining ingredients being the same as in Example 1, and used under the same process conditions therein.

For the latexes produced with MUDA other than IA, the $T \times E$ product for each is lower than that for IA, and the % hysteresis loss is higher, as will be evident from the data recorded in Table 8 herebelow. These properties are attributable to the different positioning of the carboxyl groups in the other MUDA, compared with their positions in IA.

TABLE 8

|  | IA | FA | MALA | CA | None |
|---|---|---|---|---|---|
| Tens. strength, psi | 755 | 454 | 440 | 327 | 207 |
| Elongation, % | 608 | 427 | 467 | 637 | 260 |
| T × E product (× $10^{-3}$) | 459 | 233 | 205 | 208 | 54 |
| % Hysteresis loss | 12.8 | 18.4 | 18.0 | 19.9 | 12.2 |
| $T_g$, °C. | −44 |  |  |  |  |

The $T_g$s of the other films were not measured.

EXAMPLE 5

Copolymer includes a Non-Acrylate Copolymerizable Monomer

A latex is prepared by the batched-IA process, using a premix containing a crosslinking monomer and a major amount of an acrylate monomer with a minor amount, no more than 30 phr, and preferably from 1 phr to about 20 phr, of a non-acrylate monomer, the remaining amount being acrylate monomer, at least 40 phr of which is a $C_4$-$C_8$ alkyl acrylate ($R_2$ in structure (I) is $C_4$-$C_8$).

In the following examples, Table 9 presents data obtained with two films, one containing 5 phr of styrene (ST) and 5 phr acrylonitrile (AN), the other containing 10 phr vinyl acetate (VAC), using the following recipe:

nBA: 84 phr; NMA: 2 phr; IA: 4 phr; non-acrylate(s): 10 phr the remaining ingredients being the same as in Example 1, and used under the same process conditions therein.

TABLE 9

|  | 5 phr ST 5 phr AN | 10 phr VAC |
|---|---|---|
| Tens. strength, psi | 838 | 678 |
| Elongation, % | 670 | 630 |
| T × E product (× $10^{-3}$) | 562 | 427 |
| % Hysteresis loss | 17.8 | 13.8 |
| $T_g$, °C. | −25 | −36 |

EXAMPLE 6

Copolymer includes Plural Copolymerizable Monomers one of which is a Methacrylate A latex may also be prepared by the batched-IA process, using a premix containing no more than 30 phr of an acrylate (I) in which the alkyl group $R_1$ is $CH_3$, the remaining being one or more acrylate monomers at least 40 phr of which is a $C_4$-$C_8$ acrylate. In the following example, Table 10 presents data obtained with a film containing 10 phr of methyl methacrylate (MMA) made from a latex for which the following recipe was used:

nBA: 84 phr; NMA: 2 phr; IA: 4 phr; MMA: 10 phr

TABLE 10

|  | 10 phr MMA |
|---|---|
| Tens. strength, psi | 943 |
| Elongation, % | 560 |
| T × E product (× $10^{-3}$) | 529 |
| % Hysteresis loss | 14.5 |
| $T_g$, °C. | −29 |

From the foregoing illustrative examples it will be evident that a wide range of copolymerizable monomers may be used to provide the film with a $T_g$ in the preferred range of from about −25° to −50° C. Using a "hard" monomer in a relatively small proportion provides a high tensile strength, while maintaining a low $T_g$.

The $T_g$ and elongation of a film having desirably high tensile may be lowered by including an acrylate monomer which provides excellent elongation but not sufficient tensile strength. For example a latex is made with 2-ethylhexyl acrylate (2-EHA) in the following recipe:

2-EHA: 94 phr; NMA: 2 phr; IA: 4 phr the remaining ingredients being the same as in Example 1, and the latex made using the same process conditions therein. The film produced has the following properties:

| Tensile strength, psi | 230 |
|---|---|
| Elongation, % | 980 |
| T × E product (× $10^{-3}$) | 225. |
| $T_g$, °C. | −65.5 |

EXAMPLE 7

Copolymer Prepared with nBA and Different Crosslinking Monomers

A latex is prepared by the batched-IA process, using a premix containing the same acrylate (nBA) but different crosslinking monomers which provide markedly different elongations when used in similar amounts. In the following examples Table 11 presents data obtained with NMA and two other crosslinking monomers, N-methylol methacrylamide (NMMA) and methyl acrylamidoglycolate methyl ether (MAGME), each used in the same amount, in the following recipe:

nBA: 94 phr; crosslinking monomer: 2 phr; IA: 4 phr the remaining ingredients being the same as in Example 1, and used under the same process conditions therein.

TABLE 11

|  | NMA | NMMA | MAGME |
| --- | --- | --- | --- |
| Tens. strength, psi | 830 | 937 | 910 |
| Elongation, % | 773 | 360 | 1055 |
| T × E product (× $10^{-3}$) | 642 | 337 | 960 |
| % Hysteresis loss | 15.4 | 13.9 | 14.2 |

The T×E product is strongly influenced by the choice of crosslinking monomer but is above 300,000. The low % hysteresis loss is surprisingly maintained.

EXAMPLE 8

Copolymer Prepared in a Batched-IA Process with nBA and Different Ratios of IA and NMA Monomers, and Different Levels of Initiator In the following runs 1-8, the amount of IA was varied from 2 to 4 phr; the amount of NMA was varied from 1 to 3 phr; the remainder nBA was varied from 93 to 97 depending upon the amounts of IA and NMA used. The initiator, all of which was added to the reactor, was varied from 0.1 to 0.35 phr. The reaction temperature is maintained at 70° C. throughout.

Premix was metered into the reactor in 90 min. The recipes for surfactants and initiator are the same as in Example 1, the initiator being added at one time to the reactor.

A second initiator solution (same initator) was added starting 20 min after the addition of the first initiator solution, and continued for 3.5 hr thereafter at approximately constant rate. The second initiator solution contained DW: 10 phr; SPS: 0.15 phr; SLS: 0.05 phr; and ammonium carbonate (buffer): 0.05 phr. 'Tail time': 1.5 hr.

The data obtained for the runs is presented in Table 12 below.

TABLE 12

| Run | IA (parts) | NMA (parts) | Initiator in Reactor (parts) | Tensile Strength (psi) | Elongation (%) | T × E Product |
| --- | --- | --- | --- | --- | --- | --- |
| 1 | 4 | 2 | 0.35 | 715 | 607 | 434000 |
| 2 | 4 | 2 | 0.35 | 627 | 573 | 359000 |
| 3 | 2 | 2 | 0.35 | 710 | 420 | 298000 |
| 4 | 3 | 2 | 0.1 | 653 | 577 | 377000 |
| 5 | 2 | 1 | 0.1 | 523 | 587 | 307000 |
| 6 | 3 | 1 | 0.35 | 536 | 563 | 302000 |
| 7 | 4 | 3 | 0.35 | 587 | 603 | 354000 |
| 8 | 3 | 3 | 0.1 | 602 | 500 | 301000 |

The latex with a relatively high solids content preferably about 50% solids, produced as described in Example 2 for 4R/OPT may be conventionally cast by coagulating it with a solution containing ingredients to destabilize the latex. For example, a mold for a glove is dipped in a bath of the latex which coagulates on the mold when it is removed from the bath. The resulting set film, upon drying, forms the glove having a film thickness of about 5 to 10 mils.

EXAMPLE 9

Shaped Articles Protected by Coating or Impregnating with the IA-Containing Latex The latex may also be conventionally used to coat or impregnate various articles of arbitrary shape, to protect them. For example, articles may be protected by dipping them in the latex, or spraying the surface to be protected, with a batched-IA-containing latex, then drying the latex to leave an elastomeric film on the surface. The strength of the bonding between elastomeric film and the surface of the article upon which it is deposited depends upon the composition of the latex and the composition and characteristics of the surface upon which the latex is deposited. In all instances, a practical thickness of film is in the range from about 0.5 mil to about 50 mils, more preferably from 1 mil to about 20 mils, determined by the ability to dry it effectively, and films greater than 5 mm thick are not practical. The following are examples of shaped articles coated with the IA-containing film of this invention:

A. Automotive Body Panel

A freshly formed steel body panel for an automobile, is sprayed on its outer surface with the latex of this invention, then dried in a convection oven so that the entire outer surface of the body panel is uniformly covered with an elastomeric film. The body panel is thus protected during handling. The film is manually stripped off the body panel without leaving a residue of film or adhesive on the body panel.

B. Mylar ® sheet

One surface of a laminar sheet of Mylar polyester 1 meter wide, is spray coated with latex (40% solids) and dried to provide a film about 1 mil thick physically securely bonded to the surface to form a film-coated Mylar sheet. The film-coated Mylar sheet is then slit into strips of desired width, from about 1 cm to about 10 cm for use as masking strips with desirable release qualities, which strips are self-adhesively secured to a surface to be painted, may be heated in an oven, then stripped without leaving a residue on the finished painted article.

C. Wood Shavings

Relatively frangible wood shavings of old wood used as packing material commonly referred to as "excelsior", are spray coated with latex (40% solids) then dried in an oven. The resulting film-coated wood shavings are far more resilient than the uncoated ones. The greater resilience provides better crush-resistance because the wood shavings do not fracture.

D. Fabric Glove

The outer surface of a moisture-absorbent fabric glove such as is commonly used as a "work glove" is saturated with the IA-containing latex of this invention, and the latex then dried to provide a continuous film on the glove. The film-coated glove is water repellant, yet provides excellent "grip".

E. Milling Cutter

The cutting teeth of a cutter for a milling machine are dipped into a 55% solids latex emulsion of this invention, then dried to provide a removable protective film which absorbs the impact of sharp blows on the teeth without damaging them.

F. Threaded Pipe

The threaded ends of stainless steel pipe are dipped into a bath of latex (55% solids) and dried to provide a removable protective coating for the threads.

I claim:

1. A process for preparing a latex comprising an aqueous medium having dispersed therein particles of rubbery carboxylated acrylate polymer consisting essentially of predominantly acrylate-containing, crosslinked polymer chains including repeating units derived from itaconic acid and at least one copolymerizable monomer represented by the structure

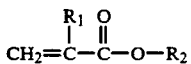

wherein $R_1$ is hydrogen or methyl;

$R_2$ represents $C_1-C_{20}$ alkyl, $C_2-C_7$ alkoxyalkyl, $C_2-C_7$ alkoxythioalkyl, or $C_2-C_7$ cyanoalkyl;

said itaconic acid is present in the range from about 1 phr to about 20 phr;

at least 40 phr of said acrylate is present as an alkyl acrylate in which alkyl is $C_4-C_8$;

said process comprising, (a) confining at least one-half of the itaconic acid to be copolymerized before remaining monomers are added, in a polymerization zone in which the temperature and pressure are maintained within specified limits, and, (b) adding to said itaconic acid in said polymerization zone, from about 0.1 to about 20 phr of a crosslinking monomer, all remaining itaconic acid, and at least 70 phr of said one copolymerizable monomer, under conditions at which it is copolymerizable with said itaconic acid and crosslinking monomer, whereby said latex is characterized by carboxyl-rich polymer chains present as discrete agglomerates randomly distributed within said latex.

2. The process of claim 1 wherein said copolymerizable monomer is a methacrylate having structure (I) in which $R_1$ is $CH_3$, and said methacrylate is present in an amount in the range from 1 phr to about 20 phr, the remaining acrylate having structure (I) in which $R_1$ is H.

3. The process of claim 1 wherein said itaconic acid is present in the range from about 2 phr to about 8 phr.

4. The process of claim 1 wherein another copolymerizable monomer is selected from the group consisting of diacrylate and dimethacrylate monomers; $C_2-C_{10}$ monoolefins; $C_2-C_{10}$ vinyl and allyl acetates; $C_4-C_{20}$ vinyl ketones; $C_4-C_{20}$ allyl ethers; $C_8-C_{20}$ vinyl aromatics; $C_3-C_6$ vinyl nitriles; $C_4-C_{20}$ vinyl amides; $C_4-C_{20}$ dienes and divinyls; $C_2-C_{20}$ monomers containing a halogen; unsaturated sulfonate monomers; $C_4-C_{20}$ unsaturated carboxylic ester and unsaturated amides; and, $C_3-C_5$ unsaturated monocarboxylic acids; and said another copolymerizable monomer is present in an amount in the range from about 1 phr to about 20 phr.

5. The process of claim 3 wherein said one copolymerizable monomer is a methacrylate having structure (I) in which $R_1$ is $CH_3$, and said methacrylate is present in an amount in the range from 1 phr to about 10 phr; and, said latex includes another copolymerizable monomer, present in an amount in the range from about 1 phr to about 10 phr, selected from the group consisting of diacrylate and dimethacrylate monomers; $C_2-C_{10}$ monoolefins; $C_2-C_{10}$ vinyl and allyl acetates; $C_4-C_{20}$ vinyl ketones; $C_4-C_{20}$ allyl ethers; $C_8-C_{20}$ vinyl aromatics; $C_3-C_6$ vinyl nitriles; $C_4-C_{20}$ vinyl amides; $C_4-C_{20}$ dienes and divinyls; $C_2-C_{20}$ monomers containing a halogen; unsaturated sulfonate monomers; $C_4-C_{20}$ unsaturated carboxylic ester and unsaturated amides; and, $C_3-C_5$ unsaturated monocarboxylic acids;

the remaining acrylate having structure (I) in which $R_1$ is H.

6. The process of claim 3 wherein the concentration of carboxyl groups on the surface of latex particles is at least 5 COOH groups per square nanometer of surface.

* * * * *